United States Patent
Dagan et al.

(10) Patent No.: US 10,387,704 B2
(45) Date of Patent: Aug. 20, 2019

(54) METHOD AND APPARATUS FOR ENABLING THE TOUCHSCREEN DISPLAY OF A MOBILE DEVICE

(71) Applicant: QUALCOMM Incorporated, San Diego, CA (US)

(72) Inventors: Noam Dagan, Binyamina (IL); Ravit Dennis, Ramat Hasharon (IL); Lior Barenboim, Haifa (IL); Lior David, Kiriat Ata (IL); Eliza Du, Cupertino, CA (US); Saurav Bandyopadhyay, Milpitas, CA (US)

(73) Assignee: Qualcomm Incorporated, San Diego, CA (US)

( * ) Notice: Subject to any disclaimer, the term of this patent is extended or adjusted under 35 U.S.C. 154(b) by 101 days.

(21) Appl. No.: 14/854,852

(22) Filed: Sep. 15, 2015

(65) Prior Publication Data
US 2016/0379039 A1    Dec. 29, 2016

Related U.S. Application Data

(60) Provisional application No. 62/186,223, filed on Jun. 29, 2015.

(51) Int. Cl.
| | | |
|---|---|---|
| G06K 9/00 | (2006.01) | |
| G06F 3/041 | (2006.01) | |
| G06F 3/048 | (2013.01) | |
| G06F 21/32 | (2013.01) | |
| H04M 1/67 | (2006.01) | |

(52) U.S. Cl.
CPC .......... G06K 9/00013 (2013.01); G06F 3/048 (2013.01); G06F 3/0412 (2013.01); G06F 21/32 (2013.01); G06K 9/0002 (2013.01); G06K 9/00006 (2013.01); H04M 1/67 (2013.01); G06F 2203/0338 (2013.01); H04M 2250/22 (2013.01)

(58) Field of Classification Search
CPC .. G06K 9/00013–0012; G06K 9/00006; G06F 3/0412; G06F 3/048; G06F 21/32; G06F 2203/0338; H04M 1/67
See application file for complete search history.

(56) References Cited

U.S. PATENT DOCUMENTS

| | | | | |
|---|---|---|---|---|
| 8,058,969 | B1 * | 11/2011 | Lai | ..................... G07C 9/00563 340/5.52 |
| 8,811,948 | B2 * | 8/2014 | Bandyopadhyay | ... G06F 1/1643 345/173 |
| 9,349,035 | B1 * | 5/2016 | Gerber | ............... G06K 9/00013 |
| 9,424,456 | B1 * | 8/2016 | Kamath Koteshwara | ................... G06K 9/0002 |

(Continued)

OTHER PUBLICATIONS

International Search Report and Written Opinion—PCT/US2016/036503 ISA/EPO—dated Aug. 19, 2016.

(Continued)

Primary Examiner — Aaron W Carter
(74) Attorney, Agent, or Firm — Brian Momeyer

(57) ABSTRACT

Disclosed is an apparatus and method for automatically enabling a touchscreen of a mobile device based on detection of the presence of a human finger. A mobile device can capture an image of an object with a fingerprint sensor. The mobile device may then enable a touchscreen display of the mobile device in response to a determination that the object captured within the image is a specific type of object.

24 Claims, 5 Drawing Sheets

(56) References Cited

U.S. PATENT DOCUMENTS

| | | | |
|---|---|---|---|
| 9,607,206 B2* | 3/2017 | Schmitt | G06K 9/0002 |
| 9,977,943 B2* | 5/2018 | Lee | G06K 9/0002 |
| 10,181,072 B2* | 1/2019 | Baek | A61B 5/0002 |
| 2010/0138914 A1* | 6/2010 | Davis | G06F 21/32 |
| | | | 726/19 |
| 2010/0215224 A1* | 8/2010 | Saito | G06K 9/00067 |
| | | | 382/124 |
| 2010/0220900 A1* | 9/2010 | Orsley | G06F 3/0421 |
| | | | 382/124 |
| 2012/0071149 A1* | 3/2012 | Bandyopadhyay | G06F 1/1643 |
| | | | 455/418 |
| 2012/0083311 A1* | 4/2012 | Salter | G06F 3/0213 |
| | | | 455/550.1 |
| 2012/0258773 A1* | 10/2012 | Alvarez Rivera | G06F 1/1656 |
| | | | 455/556.1 |
| 2013/0176108 A1 | 7/2013 | Madhani et al. | |
| 2013/0326582 A1* | 12/2013 | Kruzeniski | G06F 21/6209 |
| | | | 726/2 |
| 2014/0002388 A1 | 1/2014 | Han et al. | |
| 2014/0044322 A1* | 2/2014 | Kumar | G06K 9/00087 |
| | | | 382/124 |
| 2014/0090473 A1* | 4/2014 | Schneider | A61B 5/1172 |
| | | | 73/632 |
| 2014/0123273 A1* | 5/2014 | Matus | G06F 21/32 |
| | | | 726/17 |
| 2014/0140587 A1* | 5/2014 | Ballard | G06F 1/1686 |
| | | | 382/124 |
| 2014/0219521 A1* | 8/2014 | Schmitt | G06K 9/0002 |
| | | | 382/124 |
| 2014/0241596 A1* | 8/2014 | Chen | G06K 9/00885 |
| | | | 382/124 |
| 2014/0292666 A1* | 10/2014 | Shi | G06F 3/0416 |
| | | | 345/173 |
| 2015/0074615 A1* | 3/2015 | Han | G06K 9/00033 |
| | | | 715/863 |
| 2015/0079943 A1* | 3/2015 | Williams | H04W 12/08 |
| | | | 455/411 |
| 2015/0146944 A1 | 5/2015 | Pi et al. | |
| 2015/0146945 A1 | 5/2015 | Han et al. | |
| 2015/0161837 A1 | 6/2015 | Smith et al. | |
| 2015/0165479 A1* | 6/2015 | Lasiter | B06B 1/0666 |
| | | | 310/322 |
| 2015/0169136 A1* | 6/2015 | Ganti | B06B 1/0666 |
| | | | 345/177 |
| 2015/0319294 A1* | 11/2015 | Sudhir | H04M 1/72541 |
| | | | 455/411 |
| 2015/0356286 A1* | 12/2015 | Quirk | G06F 21/32 |
| | | | 726/19 |
| 2016/0050308 A1* | 2/2016 | Liu | H04W 52/0209 |
| | | | 455/411 |
| 2016/0070967 A1* | 3/2016 | Du | G06K 9/00093 |
| | | | 382/124 |
| 2016/0117541 A1* | 4/2016 | Lu | G06K 9/0002 |
| | | | 382/124 |
| 2016/0132187 A1* | 5/2016 | Lu | H01L 41/047 |
| | | | 345/177 |
| 2016/0227411 A1* | 8/2016 | Lundblade | H04W 12/08 |
| 2016/0232401 A1* | 8/2016 | Hoyos | G06T 7/11 |
| 2016/0246396 A1* | 8/2016 | Dickinson | G06F 3/03545 |
| 2016/0301796 A1* | 10/2016 | Tuli | H04M 1/72563 |
| 2016/0342826 A1* | 11/2016 | Apostolos | G06K 9/0008 |
| 2016/0350573 A1* | 12/2016 | Kitchens, II | G06K 9/0002 |
| 2016/0364591 A1* | 12/2016 | El-Khoury | G06K 9/0002 |
| 2016/0378244 A1* | 12/2016 | Bandyopadhyay | G06F 1/1692 |
| | | | 345/177 |
| 2016/0379039 A1* | 12/2016 | Dagan | G06F 3/0412 |
| | | | 382/124 |
| 2017/0018132 A1* | 1/2017 | Seagraves | G07C 9/00309 |
| 2017/0090024 A1* | 3/2017 | Kitchens, II | A61B 8/0858 |
| 2017/0277937 A1* | 9/2017 | Baek | A61B 5/0002 |
| 2017/0323130 A1* | 11/2017 | Dickinson | A61B 8/02 |
| 2017/0344778 A1* | 11/2017 | Lee | G06K 9/0002 |
| 2018/0276439 A1* | 9/2018 | Strohmann | G06K 9/0002 |
| 2018/0276440 A1* | 9/2018 | Strohmann | G06K 9/0002 |

OTHER PUBLICATIONS

International Search Report and Written Opinion—PCT/US2016/036503—ISA/EPO—dated Jun. 1, 2017.
Miser B., "My iPhone for Seniors", Feb. 1, 2015 (Feb. 1, 2015), 127 Pages, XP055590511, Retrieved from the Internet: URL: https://ptgmedia.pearsoncmg.com/images/9780789753618/samplepages/9780789753618.pdf [retrieved on May 21, 2019].

* cited by examiner

METHOD AND APPARATUS FOR ENABLING THE TOUCHSCREEN DISPLAY OF A MOBILE DEVICE

PRIORITY

This application claims the benefit of U.S. Provisional Application No. 62/186,223, titled "Method and Apparatus for Enabling the Touchscreen Display of a Mobile Device," filed on Jun. 29, 2015.

FIELD

The subject matter disclosed herein relates generally to activating the touchscreen of a mobile device based on presence of a user.

BACKGROUND

Mobile devices, such as mobile telephones, often use touchscreen displays. Touchscreen displays enable a user to view information on a mobile device's display, while also enabling the user to provide inputs, issue commands, launch applications, etc. using the same display as an input. For example, a user can touch a power button, home button, or other device input to enable the touchscreen, and then take various actions such as placing an outgoing phone call via touch input on the touchscreen display.

Pocket-dialing refers to the accidental placement of a phone call while a mobile phone is in the owners pocket or handbag. Pocket-dialing usually occurs by unintentionally clicking and swiping the touchscreen. The recipient of the call typically hears random background noise when answering the phone. If the caller remains unaware, the recipient will sometimes overhear whatever is happening in the callers vicinity, such as sensitive and/or private content. Pocket-dialing might also incur extra charges from the caller. Pocket-dialing could also be made to emergency contacts or services causing unintentional chaos and a privacy vulnerability.

In order to prevent the problems that result from pocket-dialing, an infrared sensor or an ambient light sensor may be used by a mobile device to attempt to detect whether the user has initiated an action on the mobile device. Such sensors, however, only potentially detect presence or proximity of the user to the mobile device, which can still result in the unintended pocket-dialing scenarios described above.

DETAILED DESCRIPTION

Figure 1:
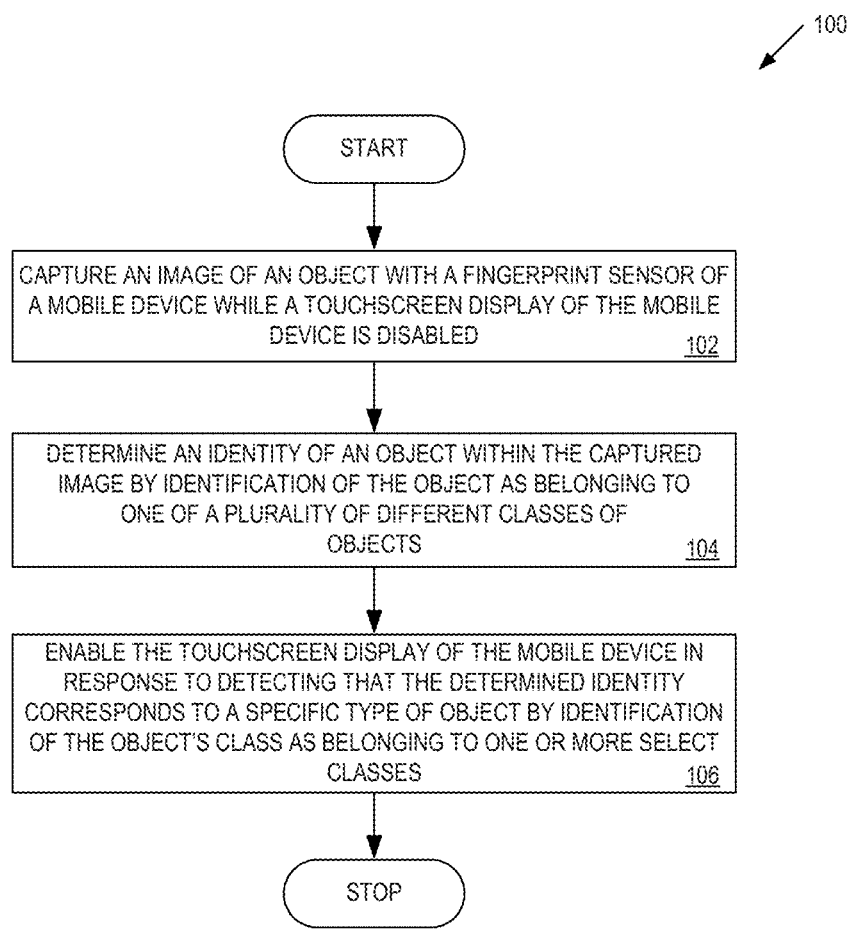
FIG. 1 is a flow diagram of one embodiment of a method for enabling a touchscreen of a mobile device based on a detected presence of a specific object within a fingerprint sensor image.

Methods and systems are disclosed herein for automatically enabling a touchscreen of a mobile device based on detection of the presence of a human finger. In one embodiment, the mobile device may be a mobile telephone, a smartphone, a tablet computer, a portable gaming device, or any other mobile device. For ease of discussion, the remaining description will utilize the term mobile device for illustrative purposes, and not by way of limitation.

In one embodiment, a mobile device with a touchscreen display includes a fingerprint sensor. The mobile device may optionally include power and/or home buttons. In one embodiment, the fingerprint sensor may be integrated into or located below the home button of the mobile device. In another embodiment, the fingerprint sensor is located beneath a portion of the touchscreen display.

In one embodiment, the fingerprint sensor is a sensor capable of capturing an image of an object touching, or proximate to, the fingerprint sensor. For example, the fingerprint sensor may be an ultrasonic fingerprint sensor that transmits an ultrasonic signal and captures the reflection (if any) of a returned signal on a thin-film transistor (TFT) pixel array. In one embodiment, from returned signal data, a three-dimensional (3D) image of the object can be created, analyzed, and the identity of the object determined. The identity of the object may be used to differentiate, as discussed below, when a human finger is touching, or proximate to, the fingerprint sensor by identifying the object as belonging to one or more of a plurality of different classes of object, and when another object (e.g., an unknown object in a user's handbag or pocket) is pressing, or proximate to, the fingerprint sensor by identifying the object as belonging to other classes of objects. For example, the one class of objects could be objects of the type human finger, and other classes of object could be objects of the type non-human finger, unknown object, no object, as well as other classes of objects. In one embodiment, when presence of a human finger is detected with the fingerprint sensor, the touchscreen display of the mobile device is enabled.

In one embodiment, where the mobile device includes a power and/or home button, a process to determine whether to enable a touchscreen display of the mobile device is initiated when the pressing of the power and/or home button is detected. In one embodiment, the fingerprint sensor is turned on and an image is captured, for example using the transmission and capture of an ultrasonic signal, of an object in proximity to the fingerprint sensor. The image is analyzed to determine whether the object captured in the image is a human finger or air (e.g., absence of any object), in which case the mobile device's touchscreen display is enabled. Enabling the touchscreen display includes powering the mobile device's touchscreen display and enabling the receipt of input, such as user input to place calls, select applications, make an emergency call, etc. For example, enabling the touchscreen display can be accomplished by transitioning the mobile device out of a sleep, standby, inactive, or other low-power mode. However, when the object captured in the image is something other than a human finger or air, such as a pocket, handbag, unknown object that resembles a finger, etc., the mobile device's touchscreen display remains disabled (e.g., the device remains in the sleep, standby, inactive, or other low-power mode) and is not enabled to receive input via the touchscreen display.

In another embodiment, the mobile device may not include a separate power and/or home button. Instead, the fingerprint sensor can serve as the home button, power button, and fingerprint scanner. In this embodiment, when a press of the fingerprint sensor is detected, the fingerprint sensor may be turned on, capture an image of the detected object, and analyze the image to determine an identity of the object within the image. In this embodiment, when the object captured in the image includes a human finger, the mobile device's touchscreen can be enabled. However, when the object captured in the image includes something other than a human finger, including the lack of any object (e.g., air), the mobile device's touchscreen remains disabled.

In both embodiments, where the mobile device includes a home button and where the mobile device does not include a home button, detection of the appropriate object, such as identifying the object as belonging to one or more classes of a plurality of different classes of objects, within a captured fingerprint sensor image is a prerequisite to enabling the touchscreen display of the mobile device. That is, no touch sensing via the touchscreen display is permitted until after the presence of an appropriate type of object is detected using the image capture and object identification processes discussed herein.

For example, a mobile device may be protected for one or more enrolled users of the mobile device (e.g., those users with access credentials for unlocking and using the mobile device). In one embodiment, authentication of an enrolled user can include authentication via fingerprint scan or password entry using touchscreen input. When the home button, power button, or fingerprint sensor is pressed in a conventional mobile device, the device would activate the touchscreen for authentication purposes, such as during the capture and analysis of a user's fingerprint or to receive input of a security code via the touchscreen display. Because mobile devices typically allow for emergency services communication even when a user has not been authenticated to a protected device, by activating the touchscreen for authentication purposes, inadvertent touches could swipe and/or activate emergency dialing communications resulting in unintended pocket dialing consequences. Thus, by having the image capture, object detection, and touchscreen display enablement controls discussed above, access to emergency communication functions of a password protected mobile device can be provided without the problems associated with unwanted pocket-dialing. Furthermore, access to emergency services can be provided to an unauthorized user, such as a non-enrolled user, by unlocking those emergency services from a locked state in response to detection of an appropriate type of object, such as a human finger, as discussed herein.

FIG. 1 is a flow diagram of one embodiment of a method 100 for enabling a touchscreen of a mobile device based on a detected presence of a specific object within a fingerprint sensor image. The method 100 is performed by processing logic that may comprise hardware (circuitry, dedicated logic, etc.), software (such as is run on a general purpose computer system or a dedicated machine), firmware, or a combination. In one embodiment, the method 100 is performed by a mobile device.

Referring to FIG. 1, processing logic begins by capturing an image of an object with a fingerprint sensor of a mobile device while a touchscreen display of the mobile device is disabled (processing block 102). In one embodiment, the mobile device may be any of a mobile telephone, tablet computer, portable gaming device, etc. with a touchscreen display capable of receiving user input via the touchscreen display. However, the touchscreen display is in a disabled state such that input, in response to purposeful and inadvertent touches of the touchscreen display, is not accepted by the mobile device. In embodiments, the touchscreen may be considered to be in a disabled when the device is in any of a sleep, standby, inactive, locked, or other low-power mode. To enable the touchscreen display as discussed herein, the fingerprint sensor captures images of objects on, or in proximity to, the fingerprint sensor to determine when to change the touchscreen from the disabled state to an enabled state.

Processing logic determines an identity of an object within the captured image by identification of the object as belonging to one or more of a plurality of different classes of objects (processing block 104). In one embodiment, the image captured by the fingerprint sensor is subject to one or more image recognition processes that attempt to determine the identity of objects depicted within the captured image. In one embodiment, the object is identified as belonging to one or more different classes of objects, such as select object classes that will enable the touchscreen display of the mobile device when an object of the select classes is detected. For example, processing logic can identify the captured image as containing air (e.g., an object belonging to a class of the type air is identified when a lack of any object is detected within the image). Such a scenario might be associated with a user holding the mobile device and looking at the display screen. As another example, processing logic can identify the pattern of ridges and valleys associated with a fingerprint in a captured image, and can determine that the captured image contains a human finger (e.g., an object belonging to a class of the type human finger is identified within the image). In this scenario, a user may be pressing a home button with their finger in order to enable the touchscreen display. However, when other objects, which are not air and not a human finger (e.g., an unknown object or an identified object not from the selected classes of objects), are detected in a captured image, processing logic can identify the object within the captured image as an unknown object.

Processing logic then enables the touchscreen display of the mobile device in response to detecting that the determined identity corresponds to a specific type of object by identification of the object's class as belonging to one or more select classes (processing block 106). In one embodiment, to prevent the unwanted or inadvertent enablement of the touchscreen display of the mobile device, such as the inadvertent transitioning of the mobile device out of the sleep, standby, inactive, locked, or other low-powered state, processing logic enables the touchscreen display after specific type of objects are detected by ensuring that objects belonging to specific classes of objects have been identified (e.g., objects of the type human finger and/or air). Detection of other type of objects, such as random objects in a user's handbag or pocket, inadvertent presses by a user, etc., do not trigger the unwanted enablement of the touchscreen display of the mobile device. Thus, the identification of the specific types of object(s) as belonging to select classes of objects serves as a prerequisite to touch sensing via the touchscreen display of the mobile device, and enables the touchscreen display after an appropriate identification occurs.

Figure 2:
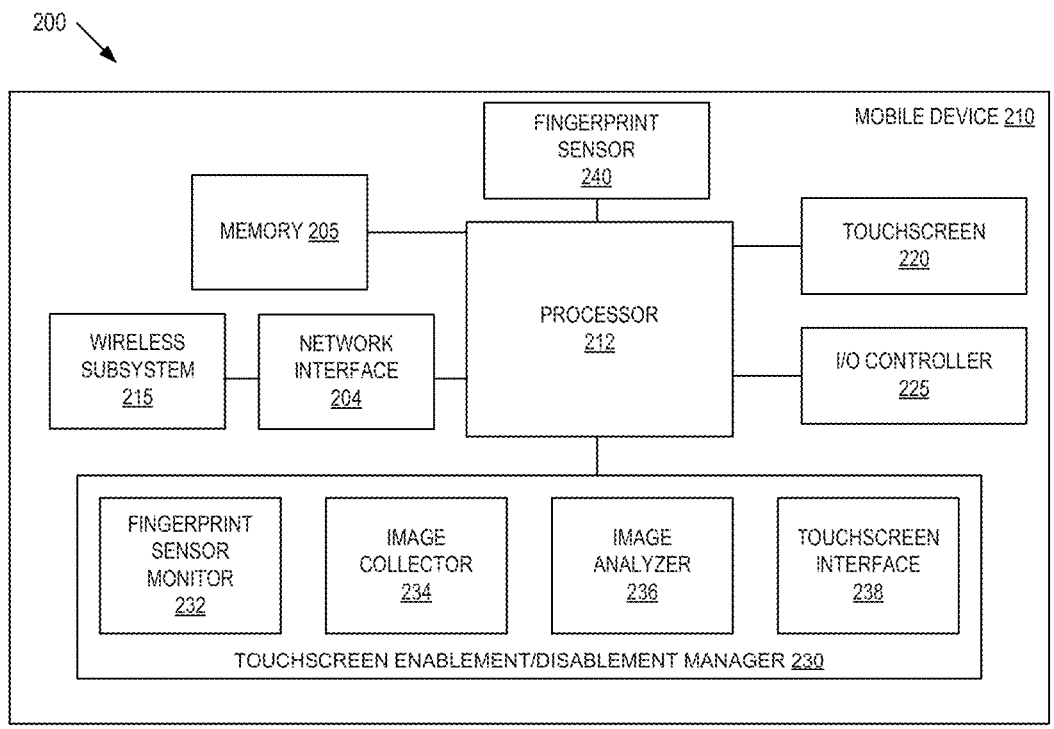
FIG. 2 is block diagram of one embodiment of a mobile device.

FIG. 2 is block diagram of one embodiment 200 of a mobile device 210. In one embodiment, mobile device 210 is a system, such as a mobile telephone, tablet computer, portable gaming device, etc., which may include one or more processors 212, a memory 205, I/O controller 225, touchscreen 220, network interface 204, and a display (which may be integrated with touchscreen 220). Mobile device also includes fingerprint sensor 240, as well as one or more additional sensors (not shown), such as accelerometers, pressure sensors, light sensors, temperature sensors, etc. Mobile device 210 may also include a number of processing modules, which may be implemented as hardware, software, firmware, or a combination, such as the touchscreen enablement/disablement manager 230, which includes fingerprint sensor monitor 232, image collector 234, image analyzer 236, and touchscreen interface 238. It should be appreciated that mobile device 210 may also include, although not illustrated, a power device (e.g., a battery), an audio input and audio output (e.g., a microphone and speaker controlled by I/O controller 225), as well as other components typically associated with electronic devices. Network interface 204 may also be coupled to a number of wireless subsystems 215 (e.g., Bluetooth, WiFi, Cellular, or other networks) to transmit and receive data streams through a wireless link.

In one embodiment, memory 205 may be coupled to processor 212 to store instructions for execution by the processor 212. In some embodiments, memory 205 is non-transitory. Memory 205 may store touchscreen enablement/disablement manager 230 to implement embodiments described herein. It should be appreciated that embodiments as will be hereinafter described may be implemented through the execution of instructions, for example as stored in memory or other element, by processor 212 of mobile device 210, and/or other circuitry of mobile device 210. Particularly, circuitry of mobile device 210, including but not limited to processor 212, may operate under the control of a program, routine, or the execution of instructions to execute methods or processes in accordance with embodiments discussed herein. For example, such a program may be implemented in firmware or software (e.g. stored in memory 205) and may be implemented by processors, such as processor 212, and/or other circuitry. Further, it should be appreciated that the terms processor, microprocessor, circuitry, controller, etc., may refer to any type of logic or circuitry capable of executing logic, commands, instructions, software, firmware, functionality and the like.

In one embodiment, fingerprint sensor monitor 232 of touchscreen enablement/disablement manager 230 is responsible for interfacing with fingerprint sensor 240 to capture images using the fingerprint sensor 240 while the touchscreen 220 is disabled (e.g., while device 210 is in a sleep, standby, inactive, or other low-powered mode). In one embodiment, the disabled state of the touchscreen 220 ensures that no user input to select applications, place calls, use emergency services functions, etc. of the mobile device can be inadvertently triggered by accidental touches (by a user or other object). Furthermore, in one embodiment, fingerprint sensor monitor 232 may additionally interface with fingerprint sensor 240 to capture images using the fingerprint sensor 240 while the mobile device 210 is in a locked state. The mobile device 210 being in a locked state further includes, as a prerequisite to access to the mobile device to place calls, select applications, or otherwise interact with the mobile device 210, a user to authenticate himself or herself as a registered or enrolled user of the mobile device (e.g., a user having proper credentials to access the mobile device).

In one embodiment, where the mobile device 210 includes a home button and/or power button (not shown), fingerprint sensor monitor 232 activates fingerprint sensor 240 to capture at least one image in response to detecting a press of either the home button or the power button. However, the touchscreen 220 remains disabled pending the outcome of the recognition processes discussed herein, even though one of these buttons has been pressed.

In another embodiment, where the mobile device 210 includes an integrated fingerprint sensor and home button, fingerprint sensor monitor 232 periodically activates the fingerprint sensor 240 to capture images. As discussed above, although the fingerprint sensor 240 is activated to capture one or more images, the touchscreen 220 remains disabled pending the outcome of the recognition processes discussed herein.

Fingerprint sensor 240 is responsible for capturing one or more images of objects that are within a proximity to the fingerprint sensor 240. In one embodiment, fingerprint sensor 240 may be an ultrasonic fingerprint sensor or other fingerprint sensor type. Image collector 234 obtains the image(s) captured by fingerprint sensor 240, and provides them to image analyzer 236.

In one embodiment, image analyzer 236 performs one or more image recognition processes in an attempt to identify an object within an image captured by the fingerprint sensor 240. In one embodiment, the image recognition process attempts to identify the object as either a human finger or air (e.g., the lack of any object). That is, image analyzer 236 attempts to identify the type of object depicted within the image as belonging to one or more select classes of objects, such as object classes of the type human finger or air.

Figure 3:
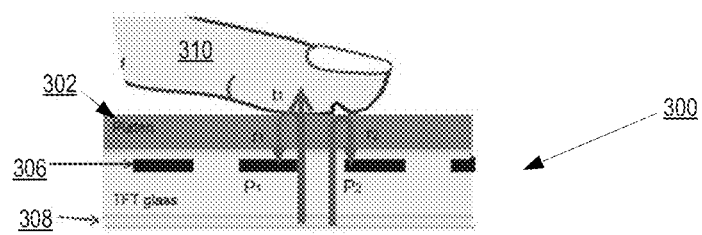
FIG. 3 illustrates one embodiment of detecting presence of a human finger using an ultrasonic fingerprint sensor.

In one embodiment, the fingerprint sensor 240 can be an ultrasonic fingerprint sensor. FIG. 3 illustrates one embodiment of detecting presence of a human finger using ultrasonic fingerprint sensor 300. As illustrated in FIG. 3, ultrasonic fingerprint sensor 300 captures an image of an object 310 by using an ultrasonic transmitter 308 to transmit a short burst of ultrasonic energy that is distributed uniformly across thin-film-transistor (TFT) pixel array 306. Any returned signal is captured by the TFT pixel array 306. For example, pixel P1 and Pixel P2 capture the reflected signals r1 and r2, respectively. The magnitude of the reflection (e.g., r1 vs r2) depends on the acoustic impedance mismatch between platen 302 and the object 310. For example, where object 310 is a human finger, almost all energy in the signal is reflected back (i.e., r2) by the platen-to-skin interface for the valley of a fingerprint. However, only part of the incident energy is reflected back (i.e., r1) by the by the platen-to-skin interface for the ridge of a fingerprint, as some energy is absorbed by the object (i.e., t1). The reflected data is read as an image by the TFT pixel array 306, and provided to image analyzer 236. The image analyzer 236 utilizes the data indicative of the reflection of the returned signal (e.g., the TFT pixel array data) to create a three dimensional image of the captured object, if any.

Returning to FIG. 2, image analyzer 236 performs one or more image recognition processes on the three dimensional image of the captured object in an attempt to identify the object. For example, image analyzer 236 may detect a fingerprint within the captured image data and conclude that an object of the type human finger has been detected. As another example, if no object is detected by image analyzer 236 within the captured image data, image analyzer can conclude that an object of the type air (e.g., the lack of any object) has been detected. However, when an unknown object, such as an object that is neither a human finger nor air is detected in captured image data, image analyzer 236 can determine that an unknown object has been detected.

In one embodiment, image analyzer 236 informs touchscreen interface 238 to enable touchscreen 220 when a specific object is identified within a captured image. For example, image analyzer 236 sends a command to touchscreen interface 238 to transition the mobile device 210 out of a low powered state to enable the touchscreen when a human finger or air is detected in a captured fingerprint sensor image. However, when the image analyzer 236 detects an unknown object, image analyzer 236 does not send a command to touchscreen interface 238 to enable the touchscreen 220, and touchscreen 220 remains in a disabled state while the device remains in the low powered state.

Thus, detection and recognition of a specific types of object belonging to one or more specific classes of objects within an image captured by fingerprint sensor 240 is a prerequisite to enabling the touchscreen 220 of the mobile device 210. That is, no touch sensing via the touchscreen 220 is permitted until after the presence of the specific class of object is detected using the image capture and object identification processes herein. For example, the analysis can determine when inadvertent touches in a user pocket or handbag have occurred, and keep the touch screen disabled to prevent inadvertent calls, application selection, emergency services communications, etc. from occurring.

When the specific class of object needed to enable the touchscreen 220 is detected by image analyzer 236, touchscreen interface 238 enables the touchscreen 220 by transitioning the mobile device 210 out of the low powered state. In one embodiment, enabling touchscreen 220 by the touchscreen interface 238 can include enabling one or more different features of the mobile device 210 via touchscreen 220 based on whether mobile device 210 is an unlocked or locked device. In one embodiment, enabling the touchscreen 220 for an unlocked device can include enabling the touchscreen to provide a user with full access to the functions of mobile device 210, such as providing the user with full access to place calls, select applications, send text messages, etc. using the touchscreen 220. In another embodiment, enabling the touchscreen 220 for a locked device (e.g., one that includes one or more access protections for enrolled users of the device), can include unlocking one or more emergency communication functions of the mobile device 210 while maintaining other functions of the mobile device in a locked state. Such emergency communication functions can include the ability to send an emergency alert signal, ability to call an emergency service provider, etc. Thus, even when mobile device 210 is secured and maintained in a locked state, access to emergency communication functions can be provided via touchscreen 220 in response to the fingerprint sensor image capture and recognition processes discussed herein.

Figure 4:
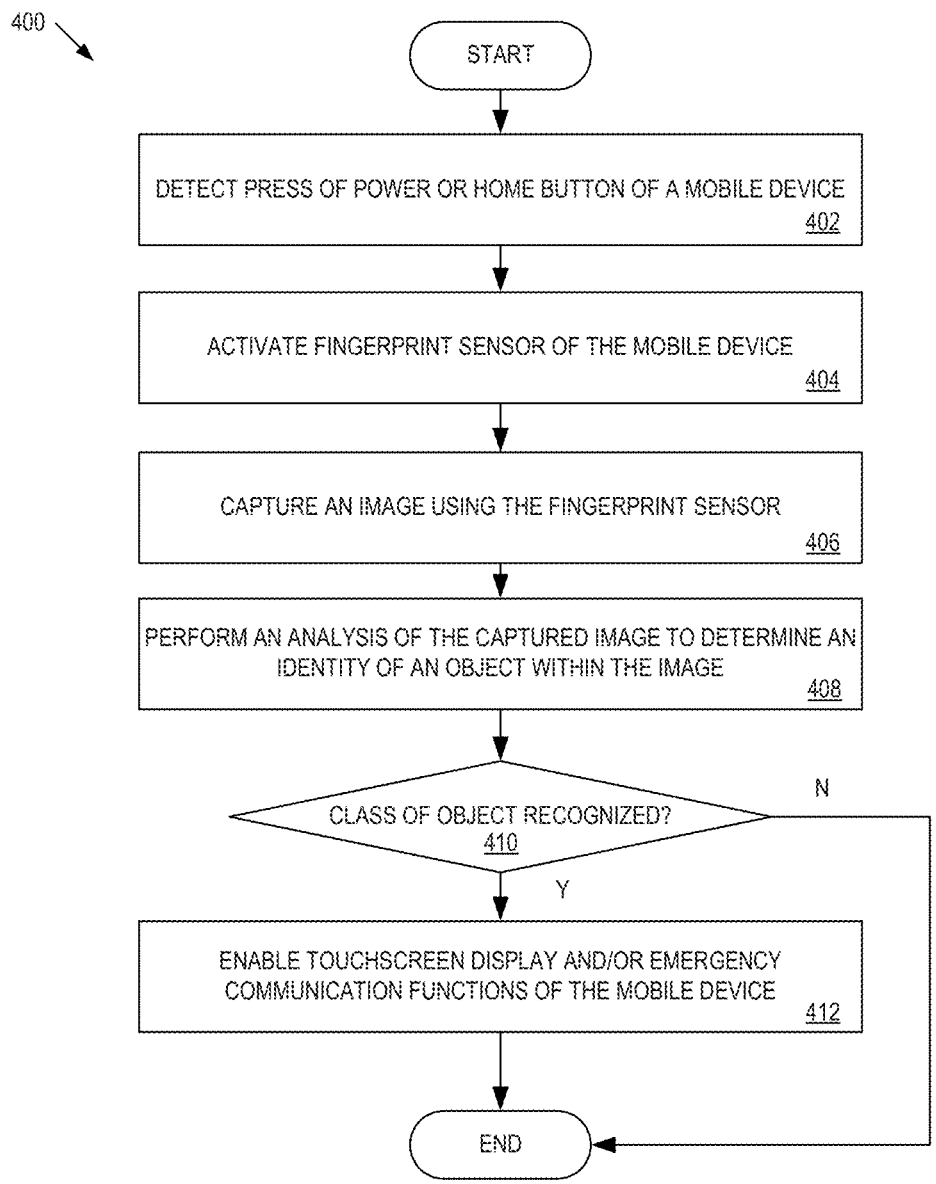
FIG. 4 is a flow diagram of one embodiment of a method for enabling a touchscreen of a mobile device utilizing a fingerprint sensor.

FIG. 4 is a flow diagram of one embodiment of a method 400 for enabling a touchscreen of a mobile device utilizing a fingerprint sensor. The method 400 is performed by processing logic that may comprise hardware (circuitry, dedicated logic, etc.), software (such as is run on a general purpose computer system or a dedicated machine), firmware, or a combination. In one embodiment, the method 400 is performed by a mobile device (e.g., mobile device 210).

Referring to FIG. 4, processing logic begins by detecting a press of a power or home button of a mobile device (processing block 402). In one embodiment, the mobile device can include a physical home button and/or power button. In a conventional mobile device, when these buttons are pressed, the touchscreen display is enabled regardless of whether the press of these buttons was intentional or inadvertent. However, in embodiments discussed herein, the touchscreen display of the mobile device remains in a disabled state after the pressing of the power or home button pending the image capture and object identification discussed below.

Processing logic activates a fingerprint sensor of the mobile device (processing block 404) and captures an image using the fingerprint sensor (processing block 406). In one embodiment, the fingerprint sensor is turned on by processing logic to capture an image of one or more objects that may be on, or in proximity to, the fingerprint sensor. In one embodiment, the fingerprint sensor can be an ultrasonic fingerprint sensor that can capture an image of objects that are not in physical contact with the fingerprint sensor, and which are located proximate to a location of the mobile device where fingerprint sensor is located.

Processing logic performs an analysis of the captured image to determine an identity of an object within the image (processing block 408). In embodiment discussed herein, processing logic attempts to recognize the class of object depicted in the fingerprint sensor image to which the object belongs. When the class of the object is recognized (processing block 410), processing logic enables the touchscreen display and/or enables one or more emergency communication functions of the mobile device (processing block 412). In one embodiment, processing logic attempts to recognize an object's class within a captured image as a human finger or air (e.g., the lack of an object). The human finger class of objects can be recognized as discussed above using an ultrasonic fingerprint sensor, or other fingerprint sensor, to detect the presence of a fingerprint. When the specific object within an image is recognized as belonging to a select class of object, the touchscreen display can be enabled to receive further input by the user, allow the user with access to one or more emergency communication functions, enable the user to being an authentication process for accessing a protected mobile device, as well as to provide the user access to other features of the mobile device via touch sensing using the touchscreen display.

However, when the class of the object is not recognized as either a human finger or air (e.g., the lack of an object) (processing block 410), the process ends with the touchscreen display of the mobile device remaining in a disabled state. In one embodiment, the touchscreen display remains disabled even though the home and/or power buttons have been pressed. Thus, inadvertent touches of the home and/or power buttons do not enable the touchscreen display and the unwanted pocket dialing consequences can be avoided.

Figure 5:
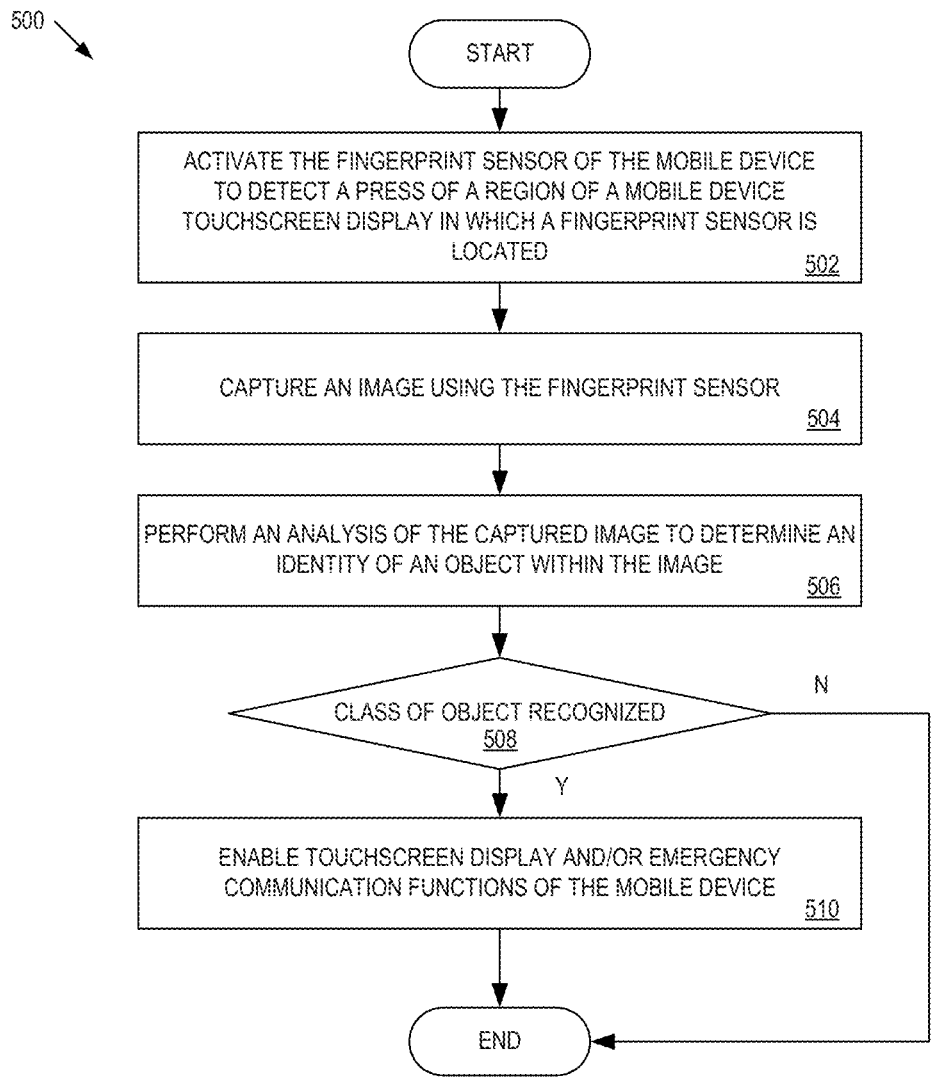
FIG. 5 is a flow diagram of another embodiment of a method for enabling a touchscreen of a mobile device utilizing a fingerprint sensor.

FIG. 5 is a flow diagram of another embodiment of a method 500 for enabling a touchscreen of a mobile device utilizing a fingerprint sensor. The method 500 is performed by processing logic that may comprise hardware (circuitry, dedicated logic, etc.), software (such as is run on a general purpose computer system or a dedicated machine), firmware, or a combination. In one embodiment, the method 500 is performed by a mobile device (e.g., mobile device 210).

Referring to FIG. 5, processing logic begins by activating the fingerprint sensor of the mobile device to detect a press of a region of a mobile device touchscreen display in which a fingerprint sensor is located (processing block 502). In one embodiment, the mobile device includes an integrated fingerprint sensor and power/home button. In this case, the home button is a virtual button that is located in a specific region of a touchscreen display of the mobile device corresponding to where the fingerprint sensor is located. In this case, the fingerprint sensor can be periodically activated to determine when a press by an object on, or in proximity to, the fingerprint sensor and virtual home button region of the touchscreen display has occurred.

Similar to FIG. 4 discussed above, processing logic then captures an image of an object on, or in proximity to, the fingerprint sensor (processing block 504). Processing logic then performs an analysis of the captured image to determine an identity of an object within the image (processing block 506). As discussed herein, processing logic attempts to recognize the class of object to which the object depicted in the fingerprint sensor image belongs.

When the class of the object is recognized (processing block 508), processing logic enables the touchscreen display and/or enables one or more emergency communication functions of the mobile device (processing block 510). In one embodiment, where the mobile device does not include power and/or home buttons, and instead includes an integrated home button and fingerprint sensor, processing logic attempts to recognize the object's class as a human finger. The human finger can be recognized as discussed above using an ultrasonic fingerprint sensor, or other fingerprint sensor, to detect the presence of a fingerprint. In one embodiment for an integrated home button and fingerprint sensor, processing logic does not use the detection of air (e.g., lack of an object) to enable the touchscreen display of the mobile device.

However, when an identity of the object is not recognized as a human finger (processing block 508), the process ends with the touchscreen display of the mobile device remaining in a disabled state. As discussed herein any inadvertent touches of integrated fingerprint sensor and virtual home button do not enable the touchscreen display and the unwanted pocket dialing consequences can be avoided.

Figure 6:
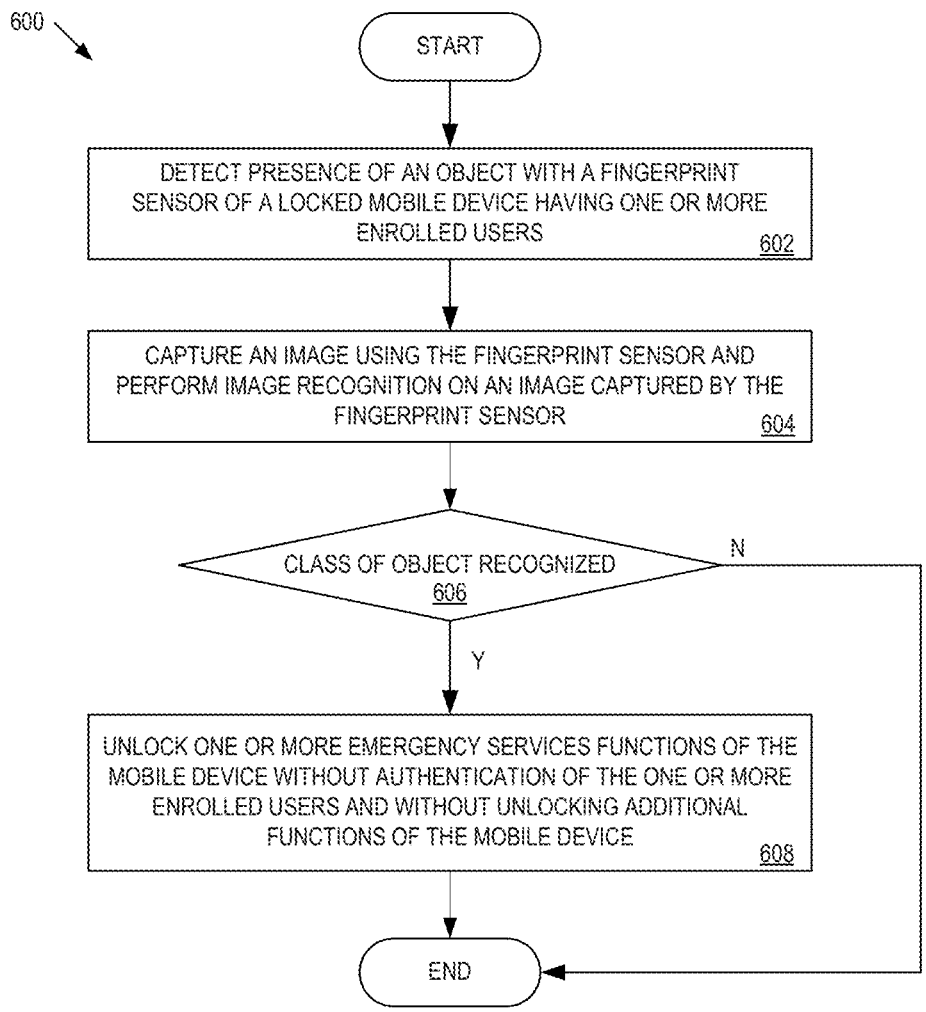
FIG. 6 is a flow diagram of one embodiment of a method for enabling access to emergency services of a mobile device for an authorized or an unauthorized user of the mobile device.

FIG. 6 is a flow diagram of one embodiment of a method 600 for enabling access to emergency services of a mobile device for an authorized or an unauthorized user of the mobile device. The method 600 is performed by processing logic that may comprise hardware (circuitry, dedicated logic, etc.), software (such as is run on a general purpose computer system or a dedicated machine), firmware, or a combination. In one embodiment, the method 600 is performed by a mobile device (e.g., mobile device 210).

Referring to FIG. 6, processing logic begins by detecting a presence of an object with a fingerprint sensor of a locked mobile device having one or more enrolled users (processing block 602). In one embodiment, the mobile device is protected for one or more enrolled users of the mobile device, such as those users with access credentials (e.g., biometric, password, pass phrase, etc. credentials) for unlocking the mobile device. The presence of the object may be detected by activating a fingerprint sensor of a mobile device according to the processes discussed above in any of FIGS. 1, 4, and 5.

Processing logic captures an image using the fingerprint sensor of the mobile device and performs image recognition on an image captured by the fingerprint sensor (processing block 604).

When the object within a captured image is recognized as belonging to one or more select object class types (processing block 606), processing logic unlocks one or more emergency services functions of the mobile device without authentication of the one or more enrolled users and without unlocking additional functions of the mobile device (processing block 608). That is, the touchscreen of the mobile device can be enabled and a subset of functions of the mobile device can be unlocked in response to identification of an object as belonging to a specific class of objects within a captured fingerprint sensor image, but without authentication of a fingerprint and/or receipt of a user password. For example, the subset of functions can include emergency services communication functions provided to any user, even a non-enrolled user, by the mobile device in response to detecting the specific type of object (e.g., a human finger or air) within a captured image. However, other functions, such as communication functions, access to applications, etc. remain in a locked state until after an authentication process is performed.

However, similar to the discussion above, when the class of the object is not recognized as a human finger and/or air (processing block 606), the process ends with the touchscreen display of the mobile device remaining disabled.

It should be appreciated that when the devices discussed herein are mobile or wireless devices, they may communicate via one or more wireless communication links through a wireless network that are based on or otherwise support any suitable wireless communication technology. For example, in some aspects a computing device or server may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A mobile wireless device may wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant (PDA), a tablet, a mobile computer, a laptop computer, a tablet, an entertainment device (e.g., a music or video device), a headset (e.g., headphones, an earpiece, etc.), or any other suitable device.

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments discussed herein.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random-access memory (RAM), flash memory, read-only memory (ROM), erasable programmable read-only memory (EPROM), electronically erasable programmable read-only memory (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the embodiments. Various modifications to these embodiments will be readily apparent to those skilled in the art, and the generic principles defined herein may be applied to other embodiments without departing from the spirit or scope of the embodiments discussed herein. Thus, the above description is not intended to be limited to the embodiments shown herein, but is to be accorded the widest scope consistent with the principles and novel features disclosed herein.

What is claimed is:

1. A method for configuring a touchscreen display of a mobile device comprising:
    while the mobile device is in a low-power state, activating an ultrasonic fingerprint sensor of the mobile device, without activating the touchscreen display, in response to detecting a press of a region in which a virtual button and the ultrasonic fingerprint sensor are located, and capturing an image of one or more objects that are not in physical contact with the fingerprint sensor;
    wherein activating the ultrasonic fingerprint sensor includes transmitting a burst of ultrasonic energy distributed uniformly across a thin-film-transistor pixel array;
    capturing a three-dimensional image (3D image) of an object with the fingerprint sensor, wherein the capturing of the 3D image of the object is performed by the fingerprint sensor while the touchscreen display of the mobile device is disabled;
    performing an image recognition process on the 3D image to determine whether the object captured in the 3D image belongs to a specific class of objects; and
    in response to a determination that the object captured within the 3D image is a type of object belonging to the specific class of objects, enabling the touchscreen display of the mobile device to receive touch input via the touchscreen display and unlocking a subset of functions of the mobile device, wherein the touchscreen display is unlocked in response to the determination that the object belongs to the specific class of objects without authentication of a fingerprint from the 3D image and/or receipt of a user password.

2. The method of claim 1, wherein touch sensing via the touchscreen display is prevented until after a presence of the specific type of object is detected within a captured image, and wherein the specific type of object is an object belonging to one or more select classes of objects.

3. The method of claim 1, wherein the activating occurs in response to detection of a press of a power button or a home button of the mobile device, and wherein the method further comprises:
    performing a 3D image recognition process on the object captured within the image; and
    when the object captured within the image is determined to be one of a human finger or lack of any object, enabling the touchscreen display of the mobile device.

4. The method of claim 1, wherein the activating occurs in response to detection of a press of a region of the touchscreen display of the mobile device under which the fingerprint sensor is located, and wherein the method further comprises:

performing a 3D image recognition process on the object captured within the image; and when the object captured within the image is determined to be a human finger, enabling the touchscreen display of the mobile device.

5. The method of claim 1, wherein the touchscreen display of the mobile device is enabled in response to the determination that the object captured within the 3D image is the specific type of object without providing access to one or more additional functions of the mobile device until after an authentication process is performed.

6. The method of claim 1, wherein the mobile device is one of a mobile telephone, a tablet computer, or a portable entertainment device.

7. The method of claim 1, wherein the mobile device is a protected device having a plurality of enrolled users, and
wherein the touchscreen display is enabled for a user in response to the determination that the object captured within the 3D image is a human finger associated with the user, regardless of whether the human finger corresponds to one of the plurality of enrolled users of the mobile device.

8. The method of claim 1, wherein the mobile device is in a locked state prior to the capture of the image, further comprising:

performing an image recognition process on the object captured within the image to determine whether the object corresponds to the specific type of object; and enabling the touchscreen display of the mobile device to provide access to one or more emergency services functions of the mobile device without changing the locked state of the mobile device.

9. The method of claim 8, wherein providing access to the one or more emergency services functions of the mobile device comprises unlocking only the one or more emergency services functions from the locked state of the mobile device in response to detection of the specific type of object.

10. A mobile device comprising:

a touchscreen display;

a fingerprint sensor operably configured to capture a three-dimensional image (3D image) of an object, wherein the fingerprint sensor is an ultrasonic fingerprint sensor configured to capture an image of one or more objects that are not in physical contact with the fingerprint sensor; and a processor coupled with the fingerprint sensor and the touchscreen display operably configured to:

while the mobile device is in a low-power state, activate the fingerprint sensor, without activating the touchscreen display, in response to detecting a press of a region in which a virtual button and the ultrasonic fingerprint sensor are located;

wherein the ultrasonic fingerprint sensor is configured to, once activated, transmit a burst of ultrasonic energy distributed uniformly across a thin-film-transistor pixel array;

perform an image recognition process on the 3D image to determine whether the object captured in the 3D image belongs to a specific class of objects, and enable the touchscreen display from a disabled state in response to a determination that the object captured within the 3D image is a type of object belonging to the specific class of objects, wherein the capture of the 3D image of the object is performed by the fingerprint sensor while the touchscreen display of the mobile device is disabled, and wherein the touchscreen display is enabled to receive touch input via the touchscreen display and a subset of functions of the mobile device are unlocked in response to the determination that the object captured within the 3D image belongs to a type of object belonging to the specific class of objects without authentication of a fingerprint and/or receipt of a user password.

11. The mobile device of claim 10, wherein touch sensing via the touchscreen display is prevented until after a presence of the specific type of object is detected within a captured image, and wherein the specific type of object is an object belonging to one or more select classes of objects.

12. The mobile device of claim 10, wherein the activating occurs in response to detection of a press of a power button or a home button, and wherein the processor is further comprised to:

perform a 3D image recognition process on the object captured within the image, and when the object captured within the 3D image is determined to be one of a human finger or lack of any object, enable the touchscreen display.

13. The mobile device of claim 10, wherein the activating occurs in response to detection of a press of a region of the touchscreen display under which the fingerprint sensor is located, and wherein the processor is further comprised to:

perform a 3D image recognition process on the object captured within the image, and when the object captured within the 3D image is determined to be a human finger, enable the touchscreen display.

14. The mobile device of claim 10, wherein the touchscreen display is enabled in response to the determination that the object captured within the 3D image is the specific type of object without providing access to one or more additional functions of the mobile device until after an authentication process is performed.

15. The mobile device of claim 10, wherein the mobile device is one of a mobile telephone, a tablet computer, or a portable entertainment device.

16. The mobile device of claim 10, wherein the mobile device is a protected device having a plurality of enrolled users, and
wherein the touchscreen display is enabled for a user in response to the determination that the object captured within the 3D image is a human finger associated with the user, regardless of whether the human finger corresponds to one of the plurality of enrolled users of the mobile device.

17. The mobile device of claim 10, wherein the mobile device is in a locked state prior to the capture of the image, further comprising the processor to:

perform an image recognition process on the object captured within the image to determine whether the object corresponds to the specific type of object, and enable the touchscreen display of the mobile device to provide access to one or more emergency services functions of the mobile device without changing the locked state of the mobile device.

18. The mobile device of claim 17, wherein the processor to provide access to the one or more emergency services functions of the mobile device further comprises the processor to unlock only the one or more emergency services functions from the locked state of the mobile device in response to detection of the specific type of object.

19. A non-transitory computer readable storage medium including instructions that, when executed by a processor, cause the processor to perform a method for configuring a touchscreen display of a mobile device comprising:
   while the mobile device is in a low-power state, activating an ultrasonic fingerprint sensor of the mobile device, without activating the touchscreen display, in response to detecting a press of a region in which a virtual button and the ultrasonic fingerprint sensor are located;
   wherein activating the ultrasonic fingerprint sensor includes transmitting a burst of ultrasonic energy distributed uniformly across a thin-film-transistor pixel array;
   capturing a three-dimensional image (3D image) of an object not in contact with the fingerprint sensor, wherein the capturing of the 3D image of the object is performed by the fingerprint sensor while the touchscreen display of the mobile device is disabled;
   performing an image recognition process on the 3D image to determine whether the object captured in the 3D image belongs to a specific class of objects; and
   in response to a determination that the object captured within the 3D image is a type of object belonging to the specific class of objects, enabling the touchscreen display of the mobile device to receive touch input via the touchscreen display and unlocking a subset of functions of the mobile device, wherein the touchscreen display is unlocked in response to the determination that the object belongs to the specific class of objects without authentication of a fingerprint from the 3D image and/or receipt of a user password.

20. The non-transitory computer readable storage medium of claim 19, wherein touch sensing via the touchscreen display is prevented until after a presence of the specific type of object is detected within a captured image, and wherein the specific type of object is an object belonging to one or more select classes of objects.

21. The non-transitory computer readable storage medium of claim 19, wherein the mobile device is a protected device having a plurality of enrolled users, and
   wherein the touchscreen display is enabled for a user in response to the determination that the object captured within the 3D image is a human finger associated with the user, regardless of whether the human finger corresponds to one of the plurality of enrolled users of the mobile device.

22. A system for configuring a touchscreen display of a mobile device comprising:
   means for activating, while the mobile device is in a low-power state, an ultrasonic fingerprint sensor of the mobile device without activating the touchscreen display, wherein the means for activating the ultrasonic fingerprint sensor comprises means for transmitting a burst of ultrasonic energy distributed uniformly across a thin-film-transistor pixel array;
   means for capturing a three-dimensional image (3D image) of an object not in contact with the fingerprint sensor, wherein the capturing of the 3D image of the object is performed by the fingerprint sensor, in response to detecting a press of a region in which a virtual button and the ultrasonic fingerprint sensor are located, while the touchscreen display of the mobile device is disabled;
   means for performing an image recognition process on the 3D image to determine whether the object captured in the 3D image belongs to a specific class of objects; and
   in response to a determination that the object captured within the 3D image is a type of object belonging to the specific class of objects, means for enabling the touchscreen display of the mobile device to receive touch input via the touchscreen display and unlocking a subset of functions of the mobile device, wherein the touchscreen display is unlocked in response to the determination that the object belongs to the specific class of objects without authentication of a fingerprint from the 3D image and/or receipt of a user password,
   wherein the activating the fingerprint sensor occurs in response to detecting, while the mobile device is in the low-power state.

23. The system of claim 22, wherein touch sensing via the touchscreen display is prevented until after a presence of the specific type of object is detected within a captured image, and wherein the specific type of object is an object belonging to one or more select classes of objects.

24. The system of claim 22, wherein the mobile device is a protected device having a plurality of enrolled users, and
   wherein the touchscreen display is enabled for a user in response to the determination that the object captured within the 3D image is a human finger associated with the user, regardless of whether the human finger corresponds to one of the plurality of enrolled users of the mobile device.

* * * * *